United States Patent

Willey et al.

[11] Patent Number: 6,065,468
[45] Date of Patent: May 23, 2000

[54] HOUSING FOR OUTDOOR GAS HEATER

[75] Inventors: John R. Willey; Eric M. Kaltenmark; Ricky J. Fielder, all of Bowling Green, Ky.

[73] Assignee: Desa International, Bowling Green, Ky.

[21] Appl. No.: 09/116,686

[22] Filed: Jul. 16, 1998

[51] Int. Cl.[7] .............................. F24H 3/02; F24H 3/00; F24C 15/10; F24B 3/00
[52] U.S. Cl. ................................ 126/110 B; 126/116 B; 126/99 D; 126/220; 126/67
[58] Field of Search ........................... 126/110 B, 116 B, 126/65, 59, 67, 29, 9 R, 47, 45, 85 R, 305, 218, 220, 25 R, 92 C, 92 A, 92 AC, 99 D; 431/291; 362/172, 161

[56] References Cited

U.S. PATENT DOCUMENTS

| | | | |
|---|---|---|---|
| 936,482 | 10/1909 | Seeley | 126/29 |
| 1,298,762 | 4/1919 | Milligan | 126/25 R |
| 1,925,682 | 9/1933 | Upright et al. | 126/59.5 |
| 2,124,120 | 7/1938 | Pogue | 126/9 R |
| 2,344,403 | 3/1944 | Gaffney et al. | 126/59.5 |
| 2,749,904 | 6/1956 | Jones et al. | 126/110 B |
| 3,982,524 | 9/1976 | Diggs | 126/59.5 |
| 5,359,923 | 11/1994 | Boswell | 126/9 R |

OTHER PUBLICATIONS

Owner's Manual, Propane Construction Heater, Models TC80 and RCP80, Desa International, Apr. 1997; Owner's Manual, Propane Construction Heater, Models TC275J, RCP2000, and REM2000, Desa International, May 1997.

All–Pro Catalog Brochure, Propane Kerosene Natural Gas Heaters, SPC Products Company Feb. 1997.

Sunbeam Model H0801 Propane Convection Heater, Sunbeam 1996; Sunbeam Model H1201 Propane Convection Heater, Sunbeam 1996.

Workman Convection Heaters, L.B. White Catalog Sheet 1996; Models Salamander Heaters, L.B. White Catalog (no date).

Universal Models, National–Riverside Co. Catalog Sheets Jun. 1996.

Coleman Powermate Manual for Propane construction Heater, The Coleman Co. 1996.

Primary Examiner—Carl D. Price
Assistant Examiner—David Lee
Attorney, Agent, or Firm—Jones, Day, Reavis

[57] ABSTRACT

A housing for an outdoor gas fired construction heater that incorporates a one-piece shell design that sits on and mounts directly to the base. Openings are used in the sides near the top and the bottom of the shell to provide the burner system with a metered amount of inlet air. Integrally formed, inwardly and downwardly projecting panels protect the burner system from debris, drafts at floor level, and to shield the floor on which the burner sits from infrared energy. In order to increase the strength of the top and shell assembly, the top sits on and is directly mounted to the shell. The shell height and top openings are of a size to allow heat out but to prevent drafts from pulling the flame out of the top of the heater.

7 Claims, 1 Drawing Sheet

HOUSING FOR OUTDOOR GAS HEATER

BACKGROUND OF THE INVENTION

1. Field of the Invention

The present invention relates in general to outdoor gas heaters and in particular to a housing for an outdoor gas heater that meters the amount of air allowed into the heater while protecting the burner system and the operator during start-up. Further, because the chamber is made in one piece, it has an exceptional amount of strength compared to multipiece assemblies used in all other convection heaters. In one version, slots are specifically sized and located so as to provide improved resistance to drafts that interfere with the operation of the burner.

2. Description of Related Art Including Information Disclosed Under 37 CFR 1.97 and 1.98

Prior art vertically disposed gas burning heaters for use outdoors are generally of the type shown in FIG. 1. There is a base 10, for sitting on a floor or surface 15, on which the gas control valve 24 and the gas burner system 22 is mounted. A hollow shell 12 is formed with an open bottom and an open top. The open bottom is attached to the base 10 by means of a plurality of spaced brackets 16, thus holding the shell 12 at a spaced distance above the base 10 and creating an open area 11. A top cap or lid 14 having a center portion 20 is attached to the open top to the shell 12 by means of brackets 18. The brackets 18 thus hold the lid 14 above and in spaced relationship to the shell 12 through creating an open area 19.

It can be seen that with such a configuration, debris from the construction site can fall through the large open spaces 11 and 19. Space 19 is formed by brackets 18 attaching lid 14 to the top of the shell 12. In addition, there is no metering of the air into the burner system 22 since there is simply an open space 11 on the bottom for air to enter. Thus, gusts of wind could blow out the flame and the like. Further, the burner system 22 is not protected from debris because of open areas 11 and 19. The operator is not protected during start-up in case of flames erupting from under the bottom of the shell 12 in open areas 11.

It would be advantageous to have a housing for a construction heater that has greater strength, meters the air into the combustion process, and protects the burner system from damage by debris and mechanical abuse.

SUMMARY OF INVENTION

The present invention provides a housing for an outdoor gas fired construction heater that has a hollow base with a top portion for receiving the gas burner system, a one-piece elongated hollow shell or chamber having an open top and an open bottom and at least one side wall. The open bottom of the elongated hollow chamber is placed in contact with the top portion of the hollow base so there is no space between the shell and the base. The shell is attached to a plurality of spaced projections extending upwardly from the top portion of the hollow base. A lid is attached to and closes the open top of the hollow chamber so there is no opening in the lid itself. A first plurality of air-admitting openings is formed in at least one side wall of the elongated shell or chamber adjacent the top of the hollow chamber closed by the lid. A second plurality of air-admitting openings is formed in the elongated hollow shell or chamber adjacent the bottom of the elongated hollow chamber that is in contact with and sits directly on the top portion of the hollow base. The first and second pluralities of air-admitting openings are sufficient in number to meter admission of air to the heating element and enable the proper exhaust of combustion gases from the hollow chamber. The closed top and the plurality of air-admitting openings not only allow a metered amount of air into the shell while protecting the burner system and operator during start-up, but also the top lid mounted directly to the shell or chamber provides an exceptional amount of strength compared to the multipiece assemblies used on all other convection heaters.

Thus, it is an object of the present invention to provide a housing for an outdoor gas fired construction heater that is essentially one piece and that sits directly on the hollow base that receives the gas burner system.

It is also an object of the present invention to provide a first plurality of air-admitting openings in the at least one side wall of the elongated chamber adjacent the top of the hollow chamber closed by the lid and a second plurality of air-admitting openings in the elongated hollow chamber adjacent the bottom of the elongated hollow chamber that is in contact with and Sits directly on the top portion of the hollow base.

Thus, the present invention relates to a housing for an outdoor gas fired construction heater comprising a hollow base having a top portion for receiving the gas burner system, a plurality of spaced projections extending upwardly from the top portion of the hollow base, a one-piece elongated hollow chamber having an open top and an open bottom and at least one side wall, the open bottom of the elongated hollow chamber being in contact with and sitting on the top portion of the hollow base and attached to the plurality of spaced projections to enclose the bottom of the hollow chamber. A lid is attached to and closes the open top of the hollow chamber. A first plurality of air-admitting openings are formed in the at least one side wall of the elongated chamber adjacent the top of the hollow chamber closed by the lid. A second plurality of air-admitting openings are formed in the elongated hollow chamber adjacent the bottom that is in contact with the top portion of the hollow base, the first and second pluralities of air-admitting openings being sufficient in number and size to meter admission of air to the combustion process and enable the proper exhaust of combustion gases from the hollow chamber.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
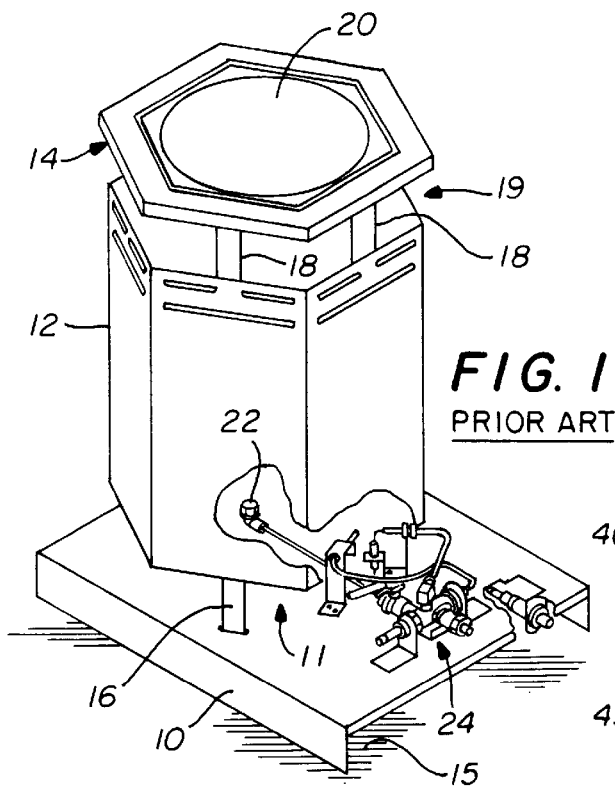
FIG. 1 is a schematic representation of a prior art housing for a gas fired outdoor construction heater.

As described earlier, FIG. 1 illustrates the prior art housing for an outdoor gas fired construction heater that is formed of multiple pieces attached to each other by means of brackets. Thus, there is a base 10, a shell 12, and a lid 14. The shell 12 is attached to the base 10 by means of brackets 16 that hold the shell 12 in spaced relationship away from the base 10 creating open area 11. In like manner, the lid 14 is attached to the shell 12 by means of brackets 18 that hold the lid 14 at a spaced distance from the top of the shell 12 creating open areas 19. The lid 14 has a center portion 20. The burner mechanism 22 is housed within the shell 12 and the gas control valve 24 is mounted on the base 10 and connected to the burner element 22 as shown.

With this system, large gusts of air can enter the spaces 11 and 19 created by the brackets 16 and 18 and cause flare-up or flame-out. In addition, debris can fall through the open areas 19 between the top and shell and damage the unit.

Figure 3:
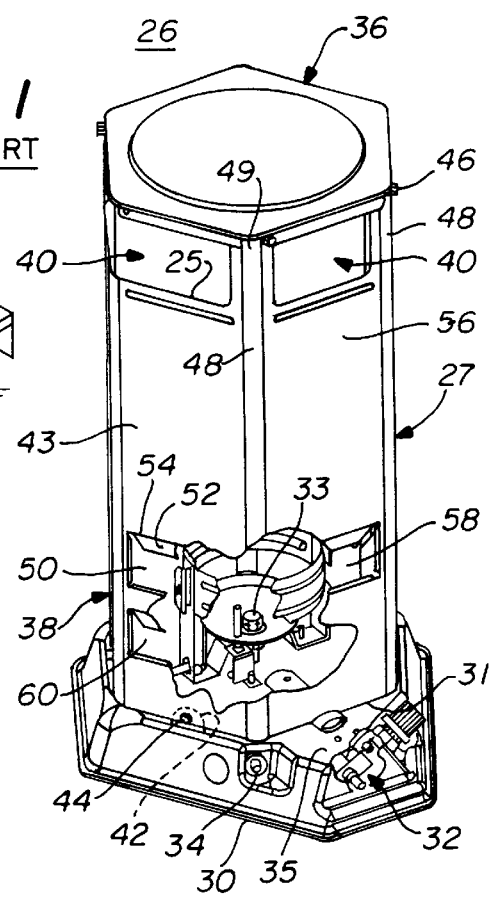
FIG. 3 is a schematic representation of a second embodiment of an outdoor gas fired construction heater.
Figure 2:
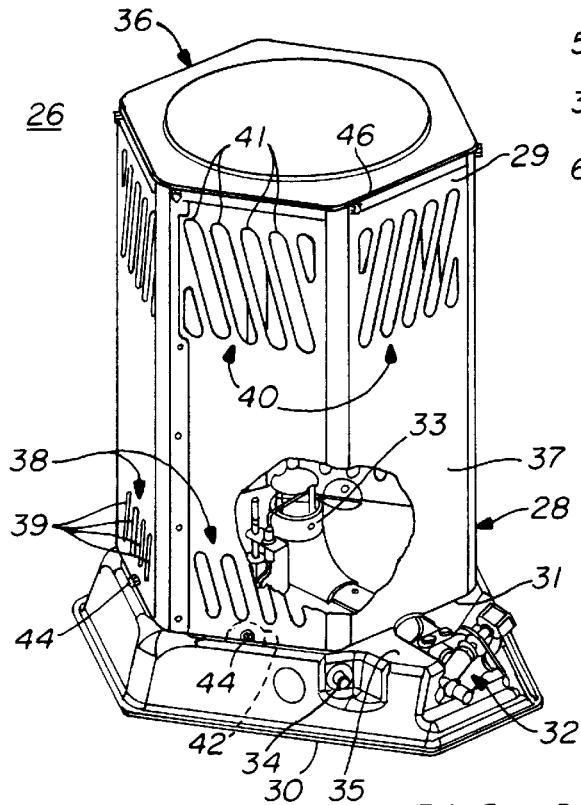
FIG. 2 is a schematic representation of a first embodiment of the housing for an outdoor gas fired construction heater of the present invention.

A more suitable housing 26 for an outdoor gas fired construction heater is shown in FIGS. 2 and 3. The novel embodiment illustrated in FIG. 2 has a base 30 on which is mounted the gas control valve 32 and a piezoelectric ignition device 34. A burner 33 is on the interior of the shell 27 and is coupled to the gas valve 32. The shell 28 is produced from two sheet metal halves that are riveted together and has an open top 29 and an open bottom 31 and at least one side wall 37. Of course, it could be circular and that would be considered one side wall. In the embodiment shown, however, there are six side walls 37. This is for illustration only and there could be as many sides as desired. The open bottom 31 of the one-elongated hollow shell 28 sits on and is in physical contact with the top portion 35 of the hollow base 30 and is attached to the base 30 by a plurality of spaced projections 42 through which screws 44 are inserted through both the shell 28 and the projection 42. Thus, the bottom 31 of the hollow shell 28 is enclosed and there is no space between the shell 28 and the top 35 of the base 30. A lid 36 is attached to and closes the open top 29 of the hollow shell 28. There is no opening in the lid 36.

A first plurality of air-discharge openings 40 are formed in the at least one side wall 37 of the elongated hollow shell 28 adjacent the top 29 of the hollow shell 28 closed by the lid 36. A second plurality of air-admitting openings 38 in the elongated hollow shell 28 are formed in the at least one side wall 37 of the hollow shell 28 adjacent the bottom 31 of the shell 28 that is in contact with the top portion 35 of the hollow base 30. The first and second pluralities of air-admitting openings 38 and 40 are sufficient in number to meter admission of air to the burner 33 necessary for combustion and to enable the proper exhaust of combustion gases from the hollow shell 28.

In particular, the first and second pluralities of air-admitting openings 38 and 40 comprise a plurality of parallel slots 39, 41 in the at least one side wall 37 adjacent the top 29 and the bottom 31 of the hollow shell 28.

In the embodiment shown in FIG. 3, again, the housing 26 comprises a hollow base 30 having a top portion 35 for receiving the controls 32 and the burner 33. Again there are a plurality of spaced projections 42 extending upwardly from the top portion 35 of the hollow base 30. The one-piece elongated hollow shell 27 has an open top 25 and an open bottom 31 and at least one side wall 43. Again, the side wall could be circular, thus being a single side wall; however, in the embodiment shown in FIG. 3 there are six side walls. There could be as many side walls as desired. The open bottom 31 of the one-piece elongated hollow shell 27 sits on and is in contact with the top portion 35 of the hollow base 30 so that there is no space between hollow shell 27 and the base 30. The shell 27 is attached to the plurality of spaced projections 42 with screws 44 to enclose the bottom 31 of the hollow shell 27. A lid 36 is attached to and encloses the open top 25 of the hollow shell 27. There are a first plurality of air-discharge opening 40 in the at least one side wall 43 of the elongated hollow shell 27 adjacent the top 25 of the hollow shell 27 closed by the lid 36. There are a second plurality of air-admitting openings 38 in the elongated hollow shell 27 adjacent the bottom 31 of the hollow shell 27 that sits on and is in contact with the top portion 35 of the hollow base 30, again, so as to prevent any space from existing between the shell 27 and the base 30. The first and second pluralities of air-admitting openings and air-discharge openings 38 and 40, respectively, are sufficient in number and size to meter the admission of air to the burner 33 necessary for combustion and enable the proper exhaustive combustion gases from the hollow shell 27.

In particular, in the embodiment shown in FIG. 3, a second plurality of spaced projections 48 are integrally formed with and extend upwardly from the open top 25 of the one-piece elongated hollow shell 27 to an outer end 49. The lid 36 is attached to the outer end 49 of the second plurality of spaced projections 48 by means of screws 46 to close the open top 25 of the hollow shell and form the first plurality of air-discharge openings 40.

As can also be seen in FIG. 3, the second plurality of air-admitting openings 38 adjacent the bottom 31 of the elongated hollow shell 27 are comprised of at least one tier or row 50 of a plurality of air-admitting openings 38. Each opening 38 includes a panel 52 extending inwardly and downwardly from side wall 43 about an edge 54 to form a panel surface that directs air in a downwardly direction into the interior of the shell 27. It will also be noted in FIG. 3 that the gas control 32 is mounted on the base 30 adjacent side wall 56, one of the six side walls 43. A single opening 58 is formed in formed in side wall 56 but two tiers of openings 50 and 60 are formed in the remaining five side walls 43 of the shell 27. This protects the operator from any flame flare-up caused by various reasons such as abnormal gusts of wind.

Further, the floor or surface the heater is set on during operation is protected from heat energy released from the heater by the size, shape, and location of openings 50 and 60 and panels 52. Prior art models use separate, discrete heat shields to provide floor protection.

The size of the air-admitting openings 38 and panel 52 depends upon the number of side walls 43 present in the shell 27 and the number of tiers or rows 50 on each side wall 43. The size of the burner 33, distance from burner 33 to the shell 27, and the vertical distance from the burner 33 to the locating surface (surface 15 in FIG. 1 in which the heater sets while operating) are the primary factors regarding the size, shape, and location of the air-admitting openings 38.

The air-admitting openings 38 are strategically located such that the panel 52 obstructs the line of sight between the burner 33 and the locating surface. A specific location of the air-admitting openings 38 is required so that the panel 52, when formed from the edge 54 of side wall 43 will be positioned in a direct path, between the burner 33 and the locating surface. The positioning of the panel 52 from the edge 54 of side wall 43 must be such that the panel 52 obstructs the infrared energy emittance toward the locating surface. By blocking the heat energy, whether infrared or conducted, the panel 52 acts to reduce the temperatures of the locating surfaces. The panel 52 also acts to direct and limit the direction and volume of air admitted by each air-admitting opening 38.

Thus, there has been disclosed a novel housing for an outdoor gas fired construction heater that has a one-piece shell that sits on and is in direct contact with a base and having a lid and, in the preferred embodiment, having multiple side walls. In each of the side walls at the top and the bottom of the shell there are openings to allow metered quantities of air to enter and exit the shell. This construction minimizes gusts of wind causing flame-outs or flame flare-ups and protects the insides of the shell from damage due to falling debris and the like. The material from which the lid, shell, and base are formed is, in the preferred embodiment, aluminized steel that resists high temperatures and assures long product life.

The corresponding structures, materials, acts, and equivalents of all means or step plus function elements in the claims below are intended to include any structure, material, or act for performing the function in combination with other claimed elements as specifically claimed.

We claim:

1. An outdoor gas fired construction heater placed on a surface and having a gas burner comprising:

a hollow base having a top portion for receiving the gas burner;

a gas control valve mounted on said base and suitable for connecting to said gas burner;

an elongated hollow shell having an open top and an open bottom and at least one side wall;

the open bottom of said elongated hollow shell sitting on and being in contact with and rigidly attached to said top portion of said hollow base;

a lid being attached to and closing the open top of the elongated hollow shell;

a first plurality of air-discharge openings in the at least one side wall of said elongated hollow shell adjacent said top of said elongated hollow shell closed by said lid;

at least one tier of a second plurality of spaced-apart air-admitting openings in said elongated hollow shell adjacent the bottom of said elongated hollow shell sufficient in number to meter admission of air to said burner; and each opening of said at least one tier including a panel formed from a part of said at least one side wall and bent inwardly to form a surface that extends downwardly from said at least one side wall about an edge to direct air in a downwardly direction into the interior of said elongated hollow shell and to obstruct infrared and conducted heat from radiating downwardly toward the surface on which the heater is located.

2. The heater of claim 1 further comprising:

a plurality of spaced apart projections formed integrally with and extending upwardly from the open top of said elongated hollow shell to an outer end; and said lid being rigidly attached to the outer end of said plurality of spaced projections to close said open top of said hollow shell and form said first plurality of air-discharging openings.

3. The heater of claim 1 wherein said elongated hollow shell has six side walls comprising a first side wall and five remaining side walls.

4. The heater of claim 3 further including:

a single air-admitting opening in said first side wall of said elongated hollow shell; and two tiers of air-admitting openings in the five remaining side walls of said elongated hollow shell.

5. An outdoor gas fired construction heater placed on a surface and having a gas burner comprising:

a hollow base having a top portion for receiving the gas burner;

a plurality of spaced projections extending upwardly from the top portion of the hollow base;

an elongated hollow shell having an open top and an open bottom and at least one side wall;

the open bottom of said elongated hollow shell sitting on and being in contact with said top portion of said hollow base and attached to said plurality of spaced projections to enclose the bottom of said elongated hollow shell;

a second plurality of spaced projections formed integrally with and extending upwardly from the open top of said elongated hollow shell to an outer end;

a lid attached to the outer end of said second plurality of spaced projections to close the open top of said elongated hollow shell and to form a first plurality of air-discharge openings adjacent said top of said elongated hollow shell closed by said lid sufficient in number to enable the proper exhaust of combustion gases from said elongated hollow shell;

at least one tier of a second plurality of spaced apart air-admitting openings in said elongated hollow shell adjacent the bottom of said elongated hollow shell sitting on and in contact with said top portion of said hollow base sufficient in number to meter admission of air to said burner; and each opening of said at least one tier including a panel formed from a part of said at least one side wall and bent inwardly to form a surface that extends downwardly from said at least one side wall about an edge to direct air in a downwardly direction into the interior of said elongated hollow shell and to obstruct infrared and conducted heat from radiating downwardly toward the surface on which the heater is located.

6. The heater of claim 5 wherein said elongated hollow shell has six side walls comprising a first side wall and five remaining side walls.

7. The heater of claim 6 further including:

gas controls mounted on said hollow base adjacent said first side wall;

a single air-admitting opening in said first side wall of said elongated hollow shell; and two tiers of air-admitting openings in the five remaining side walls of said elongated hollow shell.

* * * * *